US006702081B2

(12) United States Patent
Gorman et al.

(10) Patent No.: US 6,702,081 B2
(45) Date of Patent: Mar. 9, 2004

(54) TORQUE-TRANSMITTING ASSEMBLY AND METHOD

(75) Inventors: Michael Joseph Gorman, Ann Arbor, MI (US); Robert Lowell Moses, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/211,733

(22) Filed: Aug. 2, 2002

(65) Prior Publication Data

US 2004/0020740 A1 Feb. 5, 2004

(51) Int. Cl.$^7$ ............... F16D 25/0638; F16D 13/52
(52) U.S. Cl. ............ 192/52.2; 192/70.21; 192/85 AA; 192/109 R
(58) Field of Search .................. 192/52.2, 70.21, 192/48.7, 66.23, 85 AA, 109 R; 188/71.5, 72.4

(56) References Cited

U.S. PATENT DOCUMENTS

| 1,617,717 A | * | 2/1927 | Lombard | 192/70.21 |
|---|---|---|---|---|
| 4,437,555 A | * | 3/1984 | Tomm et al. | 192/70.21 |
| 4,724,941 A | * | 2/1988 | Wirkner | 192/52.2 |
| 5,928,110 A | | 7/1999 | Vornehm et al. | 477/166 |
| 6,176,808 B1 | | 1/2001 | Brown et al. | 477/5 |
| 6,227,340 B1 | * | 5/2001 | Braford, Jr. | 192/48.7 |

OTHER PUBLICATIONS

Hydra–Matic Division of General Motors Corporation Technician's Guide, $2^{nd}$ Edition, p. 21, Jan. 1999.

* cited by examiner

Primary Examiner—Richard M. Lorence
(74) Attorney, Agent, or Firm—Leslie C. Hodges

(57) ABSTRACT

A multi-mode torque-transmitting assembly includes a plate-supporting element having an axis, and a plate connected to the plate-supporting element such that the plate is axially movable with respect to the plate-supporting element between a first position and a second position in response to applied axial forces. Furthermore, the assembly includes a movement-inhibiting member in sufficient cooperation with the plate for selectively inhibiting axial movement of the plate. The movement-inhibiting member inhibits movement of the plate from the first position in response to a first axial force, and allows movement of the plate toward the second position in response to a second axial force greater than the first axial force, such that the assembly is operable in more than one mode.

23 Claims, 10 Drawing Sheets

TORQUE-TRANSMITTING ASSEMBLY AND METHOD

TECHNICAL FIELD

The invention relates to torque-transmitting assemblies that can operate in more than one mode.

BACKGROUND OF THE INVENTION

Torque-transmitting assemblies, such as clutch assemblies or brake assemblies, may be configured to operate in more than one mode. A prior clutch assembly, for example, includes a clutch pack, a piston actuator, and first and second independent control circuits in communication with first and second fluid chambers, respectively, for actuating the piston actuator. Under low gain mode, the first control circuit supplies fluid to the first fluid chamber to cause the piston actuator to apply a first axial force to the clutch pack. Under high gain mode, the first control circuit supplies fluid to the first fluid chamber and the second control circuit supplies fluid to the second fluid chamber to cause the piston actuator to apply a second axial force, greater than the first axial force, to the clutch pack.

With such a configuration, it may be difficult to achieve precise, repeatable control of the clutch assembly. Furthermore, because of the multiple pistons and control circuits, the clutch assembly is costly to manufacture.

SUMMARY OF THE INVENTION

The invention addresses the shortcomings of the prior art by providing a torque-transmitting assembly that can effectively and precisely operate in more than one mode. Furthermore, the assembly may be configured to operate using a single actuator.

Under the invention, a multi-mode torque-transmitting assembly includes a plate-supporting element having an axis, and a plate connected to the plate-supporting element such that the plate is axially movable with respect to the plate-supporting element between a first position and a second position in response to applied axial forces. Furthermore, the assembly includes a movement-inhibiting member in sufficient cooperation with the plate for selectively inhibiting axial movement of the plate. The movement-inhibiting member inhibits movement of the plate from the first position in response to a first axial force, and allows movement of the plate toward the second position in response to a second axial force greater than the first axial force, such that the assembly is operable in more than one mode.

Further under the invention, a method is provided for operating a multi-mode torque-transmitting assembly in multiple modes, wherein the torque-transmitting assembly includes a plate disposed between first and second additional plates, and the plate is axially movable between first and second positions in response to applied axial forces. The method includes the steps of applying a first axial force to the first additional plate such that the first additional plate engages the plate, while inhibiting axial movement of the plate so that the plate remains generally at the first position, thereby operating the assembly in a first mode; and applying a second axial force greater than the first axial force to the first additional plate such that the first additional plate causes the plate to move axially toward the second position in which the plate is engaged with the second additional plate, thereby operating the assembly in a second mode.

DESCRIPTION OF THE PREFERRED EMBODIMENT

Figure 1:
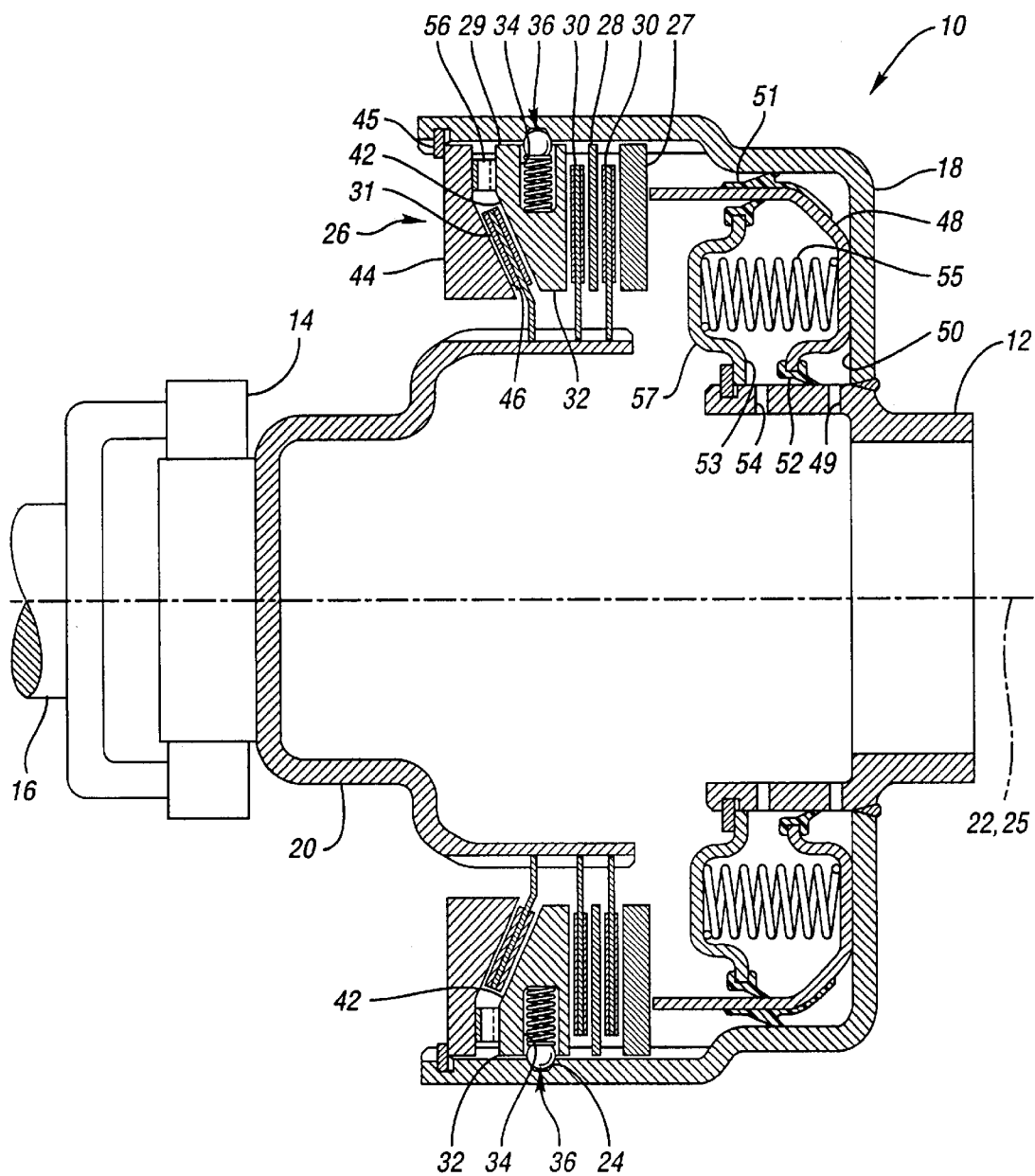
FIG. 1 is a cross-sectional view of a clutch assembly, according to the invention, including a plurality of clutch plates, wherein the clutch plates are shown disengaged from each other.

FIG. 1 shows a torque-transmitting assembly, such as clutch assembly 10, according to the invention for transmitting torque from a first shaft, such as input shaft 12, through gear set 14 to a second shaft, such as output shaft 16. The clutch assembly 10 includes first and second rotatable, plate-supporting elements, such as a housing 18 and a clutch hub 20, respectively. The housing 18 is connected to the input shaft 12 and includes a housing axis 22 and one or more recesses 24. The clutch hub 20 is connected to the gear set 14 and is disposed within the housing 18. The clutch hub 20 further has a hub axis 25 that is generally aligned with the housing axis 22. Alternatively, the housing 18 may be connected to or otherwise associated with the output shaft 16, and the clutch hub 20 may be connected to or otherwise associated with the input shaft 12.

The clutch assembly 10 further includes a plate pack, such as clutch pack 26, that has a plurality of clutch plates for transmitting torque between the housing 18 and the clutch hub 20. For example, the clutch pack 26 may include one or more first plates, such as reaction plates 27, 28 and 29, and one or more second plates, such as friction plates 30 and 31, that are engageable with the reaction plates 27, 28 and 29. The reaction plates 27, 28 and 29 are connected to and in cooperation with the housing 18 such that the reaction plates 27, 28 and 29 are axially movable with respect to the housing 18. For example, the reaction plates 27, 28 and 29 may be splined to the housing 18.

Similarly, the friction plates 30 and 31 are connected as by splines to the clutch hub 20 such that the friction plates 30 and 31 are axially movable with respect to the clutch hub 20. Furthermore, in the embodiment shown in FIG. 1, each friction plate 30 and 31 includes a friction plate body and friction material disposed on each side of the friction plate body.

Figure 2:
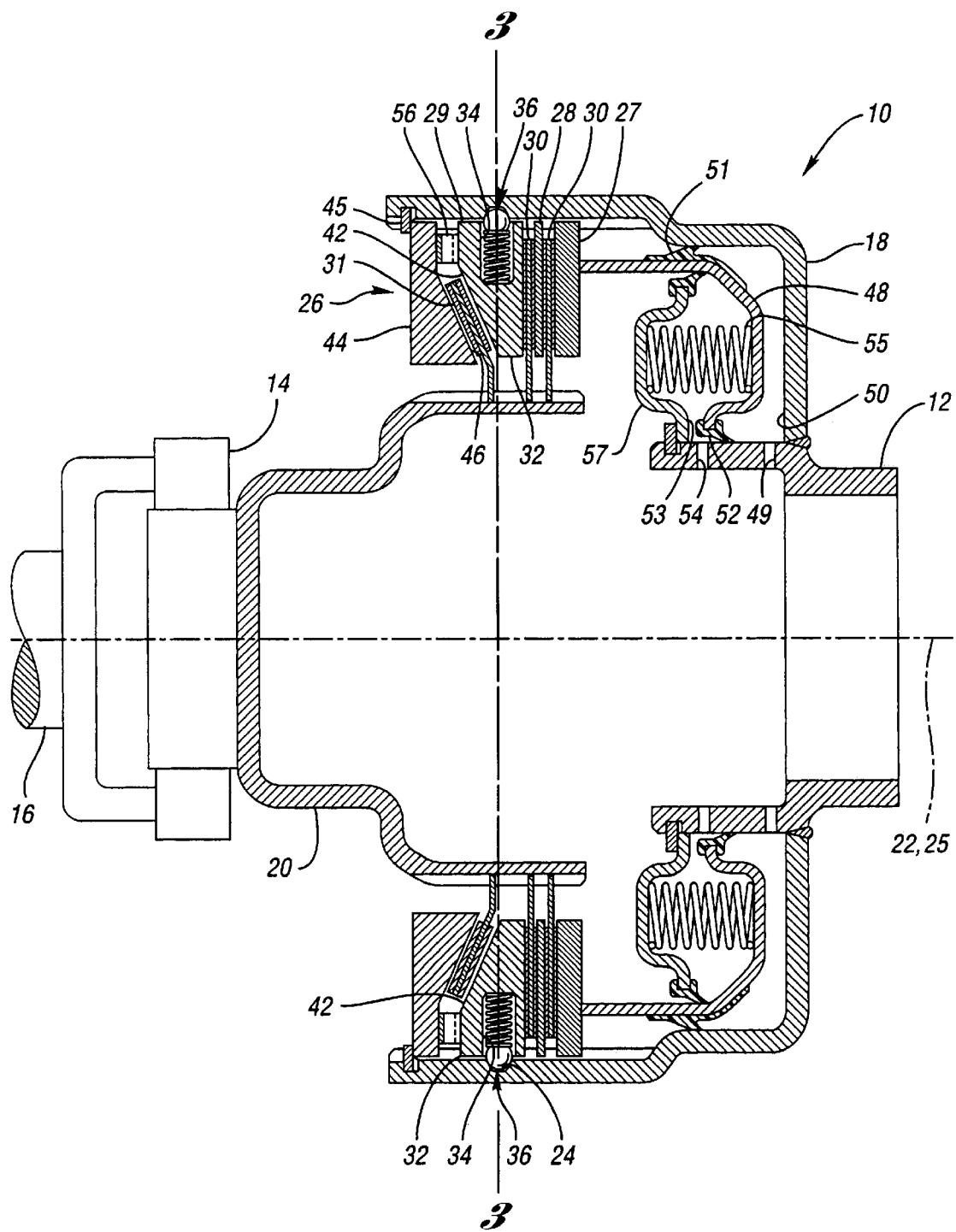
FIG. 2 is a cross-sectional view of the clutch assembly in low gain mode, in which a first quantity of clutch plates are engaged with each other.
Figure 3:
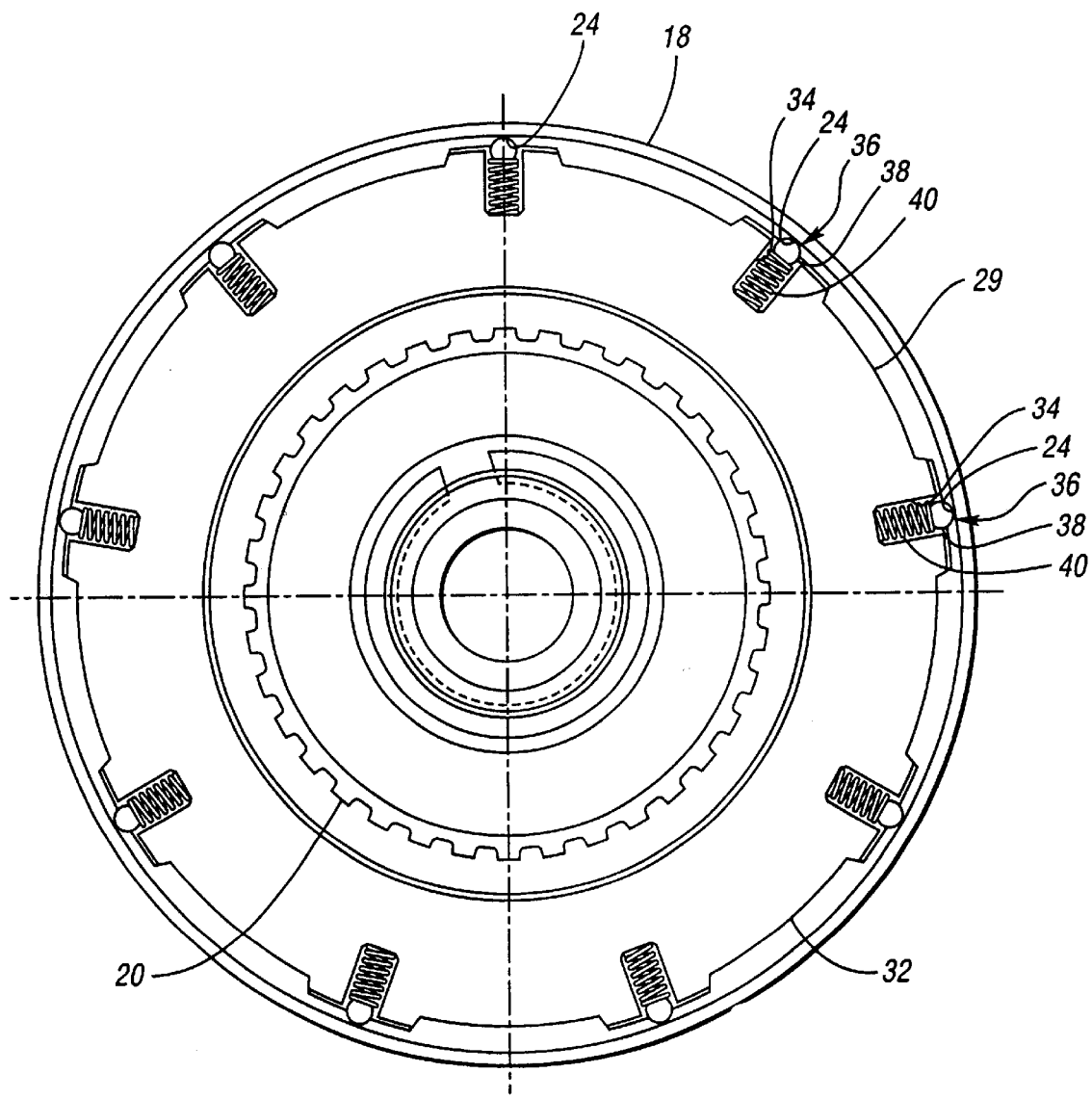
FIG. 3 is a sectional end view of the clutch assembly taken along line 3—3 of FIG. 2.

Referring to FIGS. 1–4, additional details regarding the reaction plate 29 will now be described. The reaction plate 29 includes a plate body 32 having one or more cavities 34 formed therein. The reaction plate 29 further includes one or more movement-inhibiting members, such as engaging members 36, that extend between the plate body 32 and the housing 18. In one embodiment of the invention, the reaction plate 29 includes at least two engaging members 36, and preferably at least three engaging members 36, that are spaced equally along the circumference of the plate body 32 so as to inhibit tipping or tilting of the reaction plate 29. Referring to FIG. 3, the reaction plate 29 may include nine engaging members 36 that are engageable with nine recesses 24 of the housing 18. In the embodiment shown in the figures, each engaging member 36 is disposed at least partially in a respective cavity 34. Furthermore, each engaging member 36 includes an engaging element, such as a poppet or ball 38, and a spring 40 for urging the ball 38 radially outwardly with respect to the plate body 32. Alternatively, each engaging element may have any suitable configuration such as an arcuate element that extends along a portion of the circumference of plate body 32.

Figure 4:
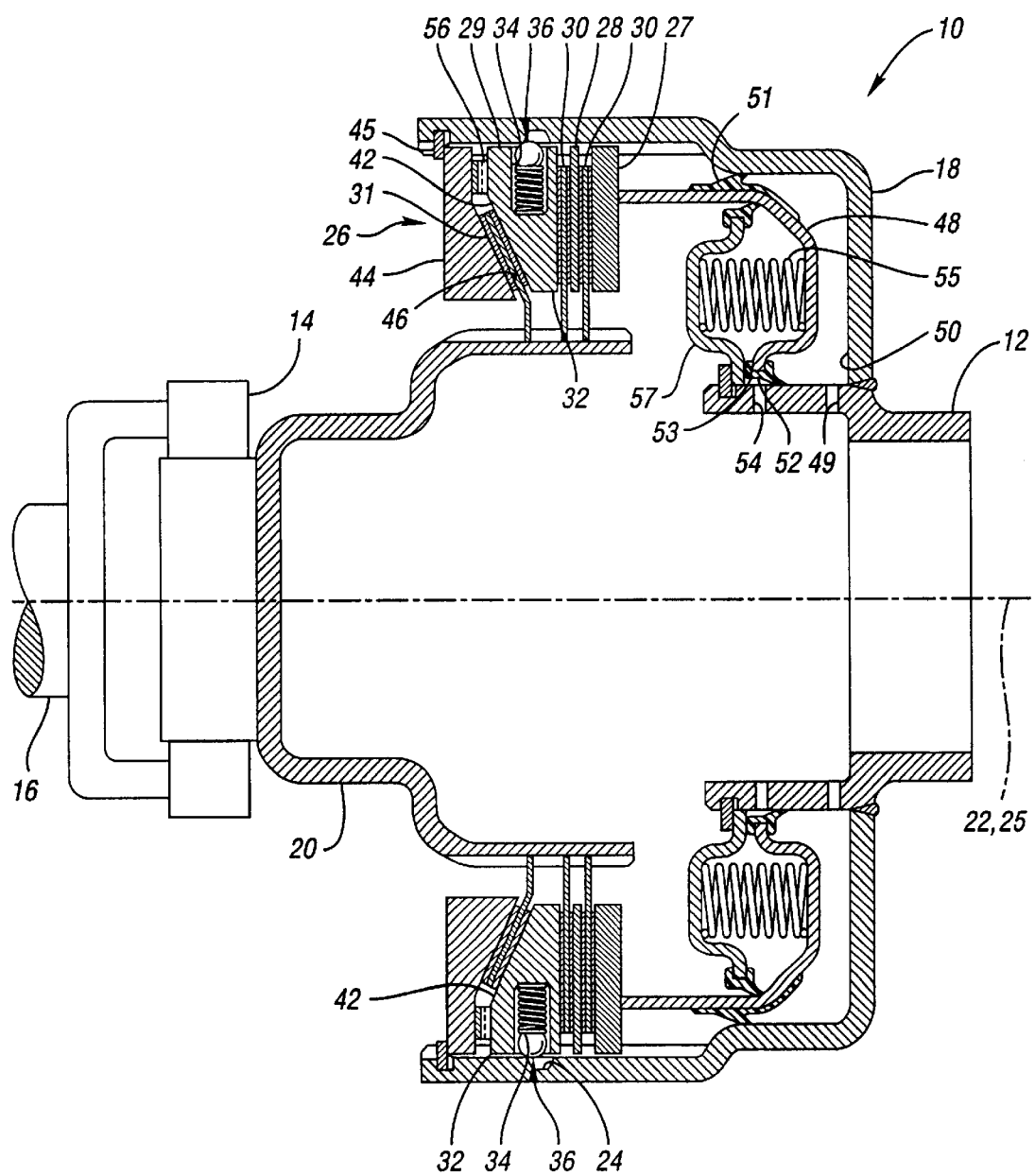
FIG. 4 is a cross-sectional view of the clutch assembly in high gain mode, in which a second quantity of clutch plates are engaged with each other.

Each engaging member 36 is also movable between a first or engaged position, shown in FIGS. 1 through 3, and a second or disengaged position shown in FIG. 4. When the engaging members 36 are in the engaged positions, each engaging member 3.6 is engaged with or in sufficient cooperation with a respective recess 24 so as to inhibit axial movement of the reaction plate 29. When the engaging members 36 are in the disengaged positions, each engaging member 36 is sufficiently disengaged from a respective recess 24 such that the reaction plate 29 is axially movable with respect to the housing 18 between a first position, shown in FIGS. 1 and 2, and a second position, shown in FIG. 4, in which the reaction plate 29 is engaged with friction plate 31.

Although the engaging members 36 are described above as being part of the reaction plate 29, the engaging members 36 may instead be considered to be movably associated with the reaction plate 29. Alternatively, the clutch assembly 10 may be provided with one or more engaging members that are movably associated with the housing 18 and engageable with, or otherwise associated with, the reaction plate 29 for inhibiting axial movement of the reaction plate 29. For example, the housing 18 may include one or more cavities, such as three cavities, that each receive a respective engaging member, and the reaction plate 29 may be provided with one or more recesses, such as three recesses, that are each engageable with a respective engaging member. Generally, then, the clutch assembly 10 may be provided with one or more movement-inhibiting members that are in sufficient cooperation with the reaction plate 29 for inhibiting axial movement of the reaction plate 29.

The plate body 32 may also include an angled surface 42 that is engageable with friction plate 31, which extends at an angle with respect to the axis 22. With such a configuration, torque capacity for a given applied axial force, which causes the reaction plate 29 to engage the friction plate 31, may be increased compared with flat clutch plates. The increased torque capacity may be due to, for example, increased area of contact between the reaction plate 29 and the friction plate 31 as compared with flat clutch plates.

The clutch pack 26 may further include an end plate 44, which may also be referred to as a reaction plate. The end plate 44 may be connected to the housing 18 such that the end plate 44 is not axially movable with respect to the housing 18. For example, the end plate 44 may be fixedly secured to the housing 18. As another example, the clutch assembly 10 may include a retaining device 45, such as a snap ring or retaining ring, that is engageable with the end plate 44 for retaining the end plate 44 in a particular position. As shown in the figures, the end plate 44 may also include an angled surface 46 that is engageable with the friction plate 31.

In addition, the clutch assembly 10 includes an actuator, such as a piston actuator 48, that is configured to apply axial forces to the clutch pack 26. Movement of the piston actuator 48 may be controlled, for example, by a control circuit or charging system (not shown), which provides fluid through aperture 49 into a piston chamber 50 so as to urge the piston actuator 48 toward the clutch pack 26. Piston chamber 50 may also be sealed by seals 51 and 52. Furthermore, the clutch assembly 10 may be provided with an additional chamber 53 and additional aperture 54 in communication with the charging system for further controlling movement of the piston actuator 48.

The clutch assembly 10 also includes first and second return springs 55 and 56, respectively, such as coil or wave springs. The first return spring 55 is disposed between the piston actuator 48 and a stationary base element 57, and is configured to urge the piston actuator 48 away from the clutch pack 26. The second return spring 56 is disposed between the reaction plate 29 and end plate 44, and is configured to urge the reaction plate 29 toward the first position.

Referring to FIGS. 1–4, operation of the clutch assembly 10 will now be described in detail. When it is desirable to operate the clutch assembly 10 in a first or low gain mode, the charging system may provide a first fluid pressure to the piston chamber 50 so as to cause the piston actuator 48 to apply a first axial force to the clutch pack 26. As a result, referring to FIG. 2, a first quantity of clutch plates engage each other to transmit torque therebetween. As shown in FIG. 2, the first quantity of plates may include plates 27, 28, 29 and 30.

When the clutch assembly 10 is operating in low gain mode, the first axial force is transmitted through plates 27, 28 and 30 to reaction plate 29. Furthermore, the engaging members 36 operate to maintain the reaction plate 29 generally at the first position such that the reaction plate 29 does not apply an axial force on friction plate 31. The return spring 56 may also assist in maintaining the reaction plate 29 generally at the first position shown in FIGS. 1 and 2. In the embodiment shown in FIG. 2, the reaction plate 29 does not engage friction plate 31 when the clutch assembly 10 is operating in low gain mode. However, some engagement between the reaction plate 29 and friction plate 31 may occur as the friction plate 31 floats between reaction plate 29 and end plate 44.

When it is desired to operate the clutch assembly 10 in a second or high gain mode, the charging system provides a second fluid pressure greater than the first fluid pressure to the piston chamber 50 so as to cause the piston actuator 48 to apply a second axial force to the clutch pack 26. The second axial force, which is greater than the first axial force, is sufficient to cause the engaging members 36 to sufficiently disengage the recesses 24. As a result, referring to FIG. 4, the reaction plate 29 is able to move from the first position (FIG. 2) to the second position (FIG. 4), so that a second quantity of clutch plates engage each other to transmit torque therebetween. As shown in FIG. 4, the second quantity of clutch plates includes all of the plates 27, 28, 29, 30, 31 and 44.

Because the clutch assembly 10 includes one or more engaging members 36 for selectively inhibiting axial movement of the reaction plate 29, the clutch assembly 10 may effectively and precisely operate in more than one mode. Advantageously, the clutch assembly 10 may be configured to operate in multiple modes using a single actuator, such as piston actuator 48, and a single charging system. Furthermore, the clutch assembly 10 may also be less costly to manufacture than prior multiple-mode clutch assemblies.

A torque-transmitting assembly according to the invention may instead be configured as a brake assembly. Such a brake assembly may have a similar configuration as the clutch assembly 10 and may include similar components. With the brake assembly, however, either the housing 18 or the hub 20 does not rotate with respect to housing axis 22. For example, either the housing 18 or the hub 20 may be fixed to a stationary element, such as a transmission housing. Furthermore, for the brake assembly, the clutch pack 26 described above may instead be referred to as a brake pack that includes a plurality of brake plates. Such brake plates may include multiple first plates and multiple second plates that are similar to the plates 27, 28, 29, 30 and 31 described above in detail. The brake pack also includes an end plate that is similar to end plate 44.

Operation of the brake assembly is similar to the operation of the clutch assembly 10, except that when torque is transmitted between the brake plates, one set of brake plates operates to slow down rotational movement of another set of brake plates. For example, if the hub 20 is stationary, the second plates operate to slow down or stop rotational movement of the first plates. Furthermore, the brake assembly is configured to operate in low gain and high gain modes in a manner similar to that described above with respect to the clutch assembly 10.

Figure 5:
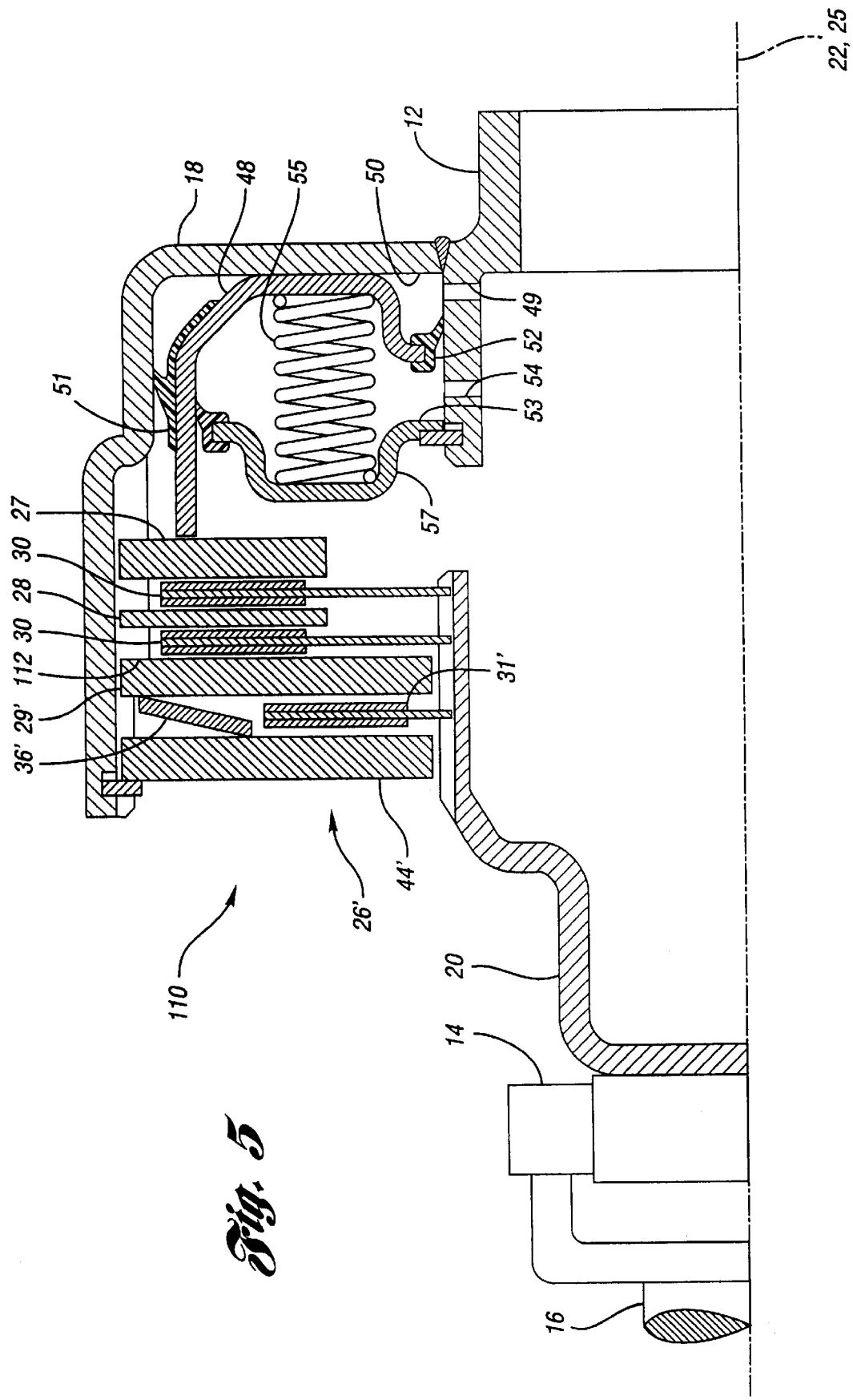
FIG. 5 is a cross-sectional view of an upper portion of a second embodiment of the clutch assembly including a plurality of clutch plates, wherein the clutch plates are shown disengaged from each other.
Figure 6:
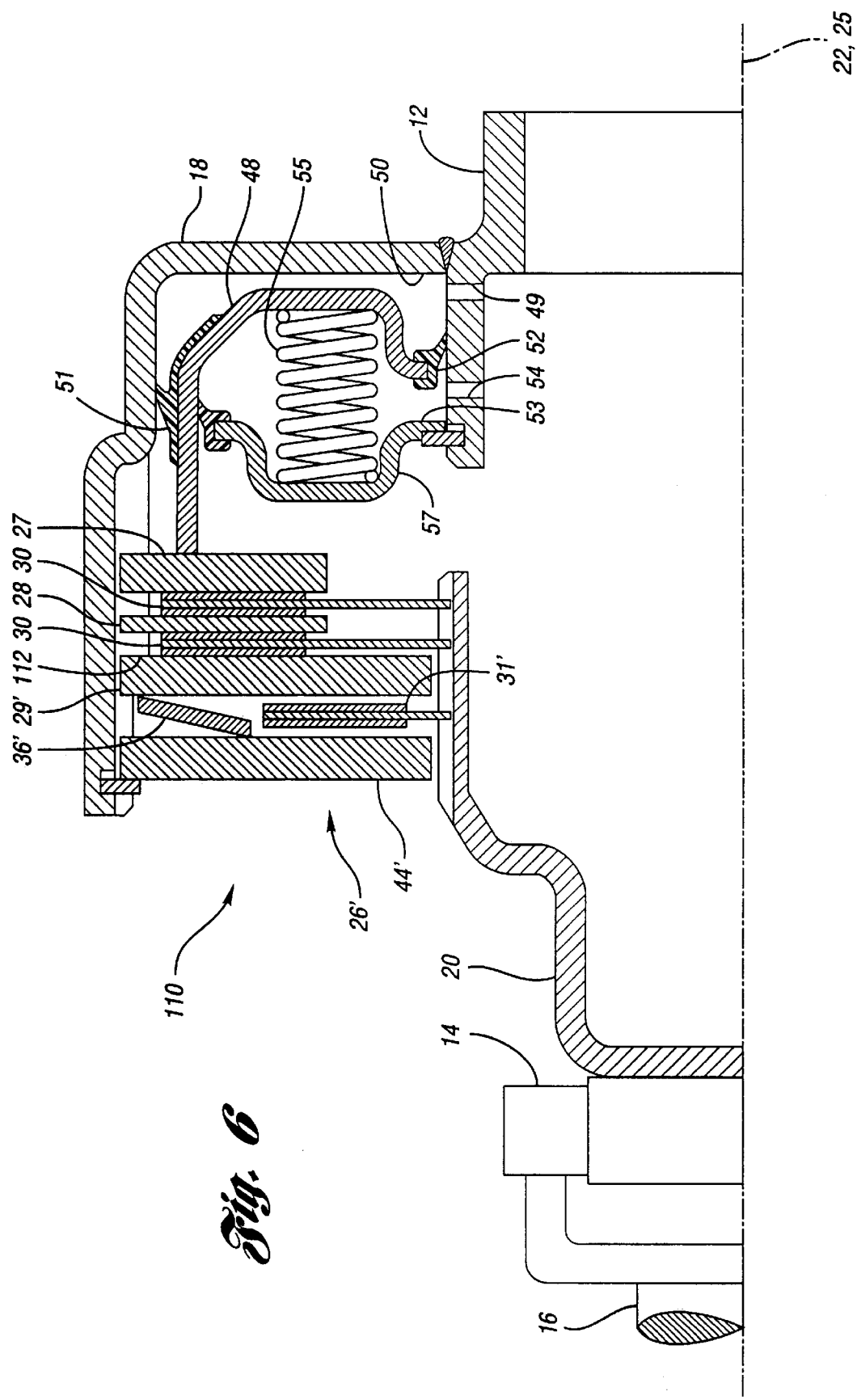
FIG. 6 is a cross-sectional view of the clutch assembly of FIG. 5 in low gain mode, in which a first quantity of clutch plates are engaged with each other.
Figure 7:
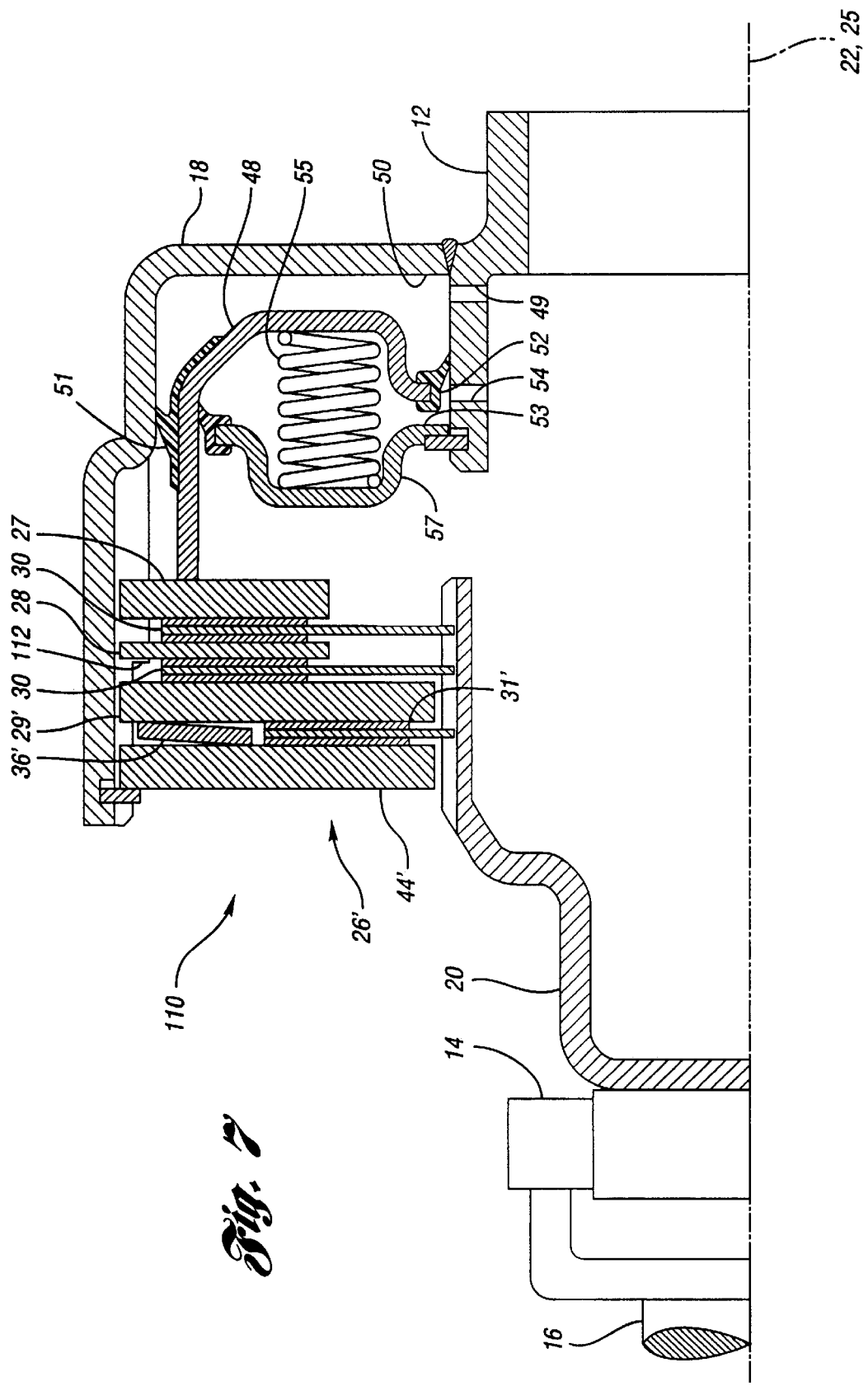
FIG. 7 is a cross-sectional view of the clutch assembly of FIG. 5 in high gain mode, in which a second quantity of clutch plates are engaged with each other.

FIGS. 5 through 7 show an upper portion of a second embodiment 110 of the clutch assembly according to the invention. Similar components of the clutch assembly 110 and clutch assembly 10 are identified with the same reference numbers. For the clutch assembly 110, however, the movement-inhibiting member is configured as a spring element 36', such as a Belleville spring or washer, that is disposed between reaction plate 29' and end plate 44'. The spring element 36' urges reaction plate 29' toward a first position, shown in FIGS. 5 and 6, in which the reaction plate 29' is engaged with a shoulder 112 of housing 18.

When the clutch assembly 110 is operating in a first or low gain mode, a charging system (not shown) provides a first fluid pressure to piston chamber 50 so as to cause piston actuator 48 to apply a first axial force to the clutch pack 26'. As a result, referring to FIG. 6, a first quantity of clutch plates engage each other to transmit torque therebetween. As shown in FIG. 6, the first quantity of plates may include plates 27, 28, 29' and 30. Furthermore, the spring element 36' functions to maintain the reaction plate 29' generally at the first position such that the reaction 29' does not apply an axial force on friction plate 31'.

When it is desired to operate the clutch assembly 110 in a second or high gain mode, the charging system provides a second fluid pressure greater than the first fluid pressure to the piston chamber 50 so as to cause the piston actuator 48 to apply a second axial force to the clutch pack 26'. The second axial force, which is greater than the first axial force, is sufficient to cause the reaction plate 29' to move from the first position (FIG. 6) to a second position, shown in FIG. 7. When the reaction plate 29' is in the second position, the reaction plate 29' is engaged with friction plate 31', and friction plate 31' is engaged with end plate 44'. Thus, when the clutch assembly 110 is operating in high gain mode, a second quantity of clutch plates are engaged with each other to transmit torque therebetween. In the embodiment shown in FIG. 7, the second quantity of clutch plates includes all of the plates 27, 28, 29', 30, 31' and 44'.

Advantageously, the spring element 36' may be configured such that the spring force exerted by the spring element 36' diminishes as the spring element 36' is flattened out, or otherwise compressed, due to movement of the reaction plate 29' toward the second position. As a result, torque capacity may be maximized when the clutch assembly 110 is operating in high gain mode.

Although the plates 29', 31' and 44' are shown with generally vertical or radial surfaces, the plates 29', 31' and 44' may have angled surfaces such as shown with the clutch assembly 10. Furthermore, a torque-transmitting assembly, according to the invention and having similar components as the clutch assembly 110, may be configured to operate as a brake assembly. With such a brake assembly, as mentioned above, either the housing 18 or the hub 20 does not rotate with respect to housing axis 22.

Figure 8:
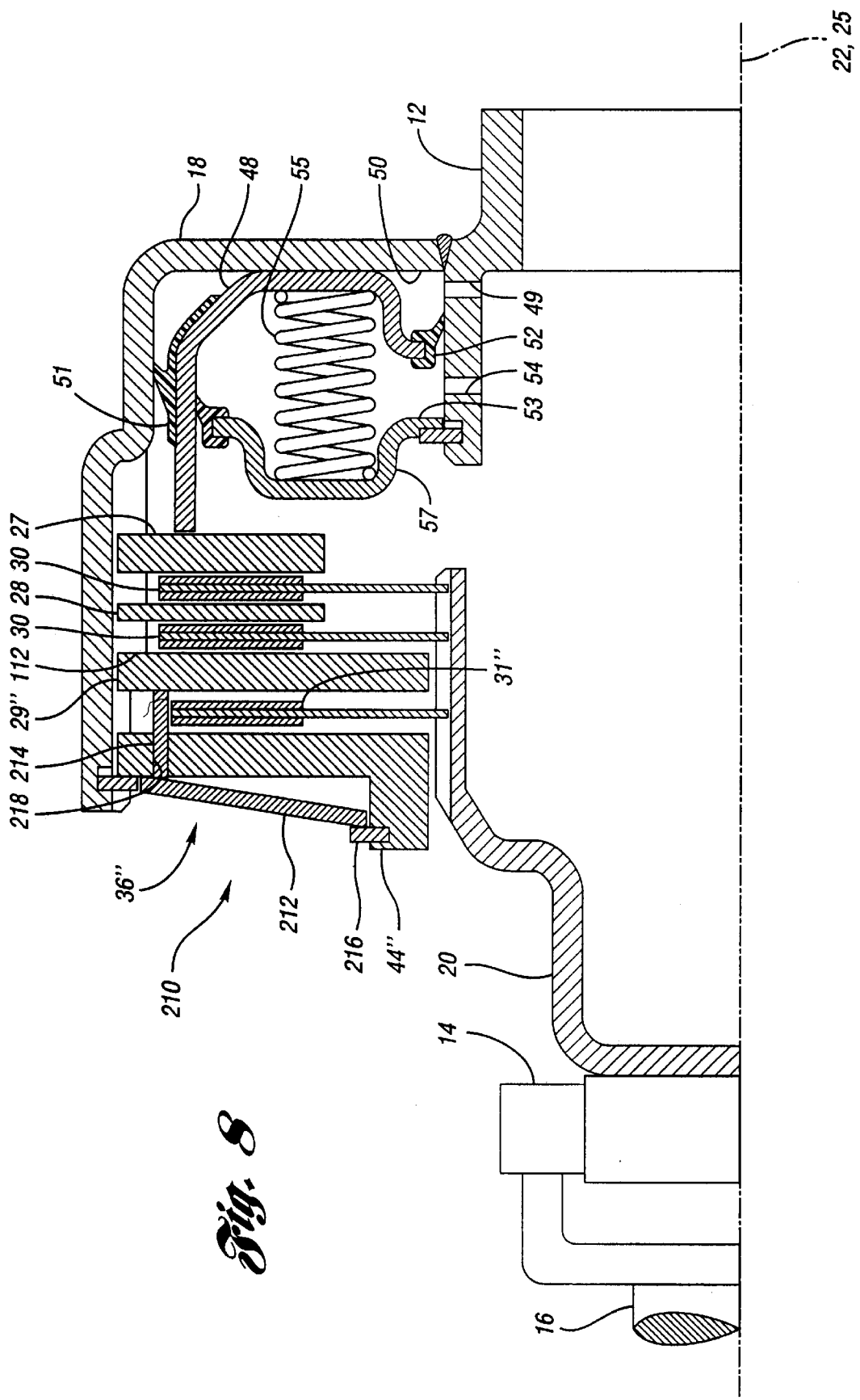
FIG. 8 is a cross-sectional view of an upper portion of a third embodiment of the clutch assembly including a plurality of clutch plates, wherein the clutch plates are shown disengaged from each other.
Figure 9:
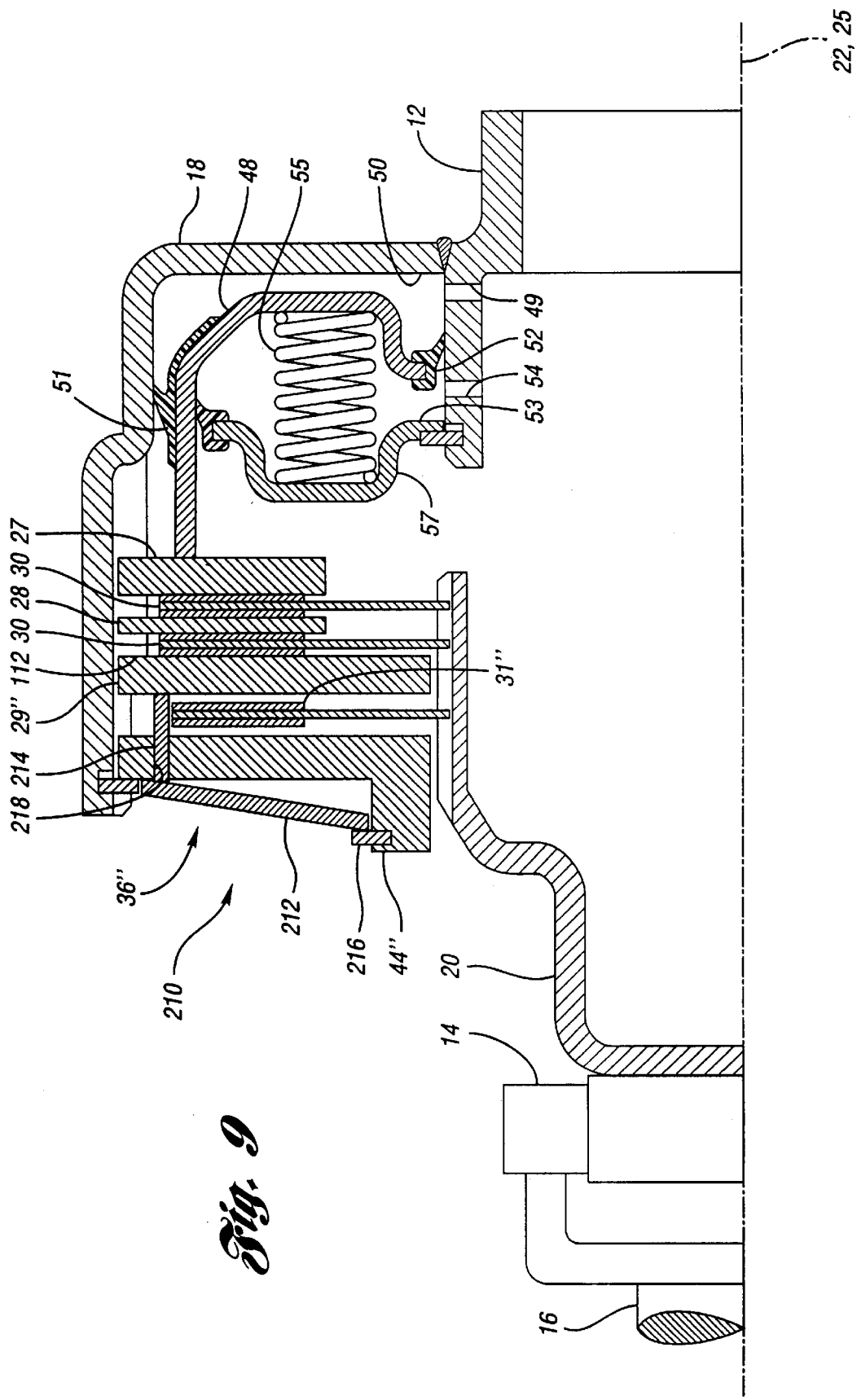
FIG. 9 is a cross-sectional view of the clutch assembly of FIG. 8 in low gain mode, in which a first quantity of clutch plates are engaged with each other.
Figure 10:
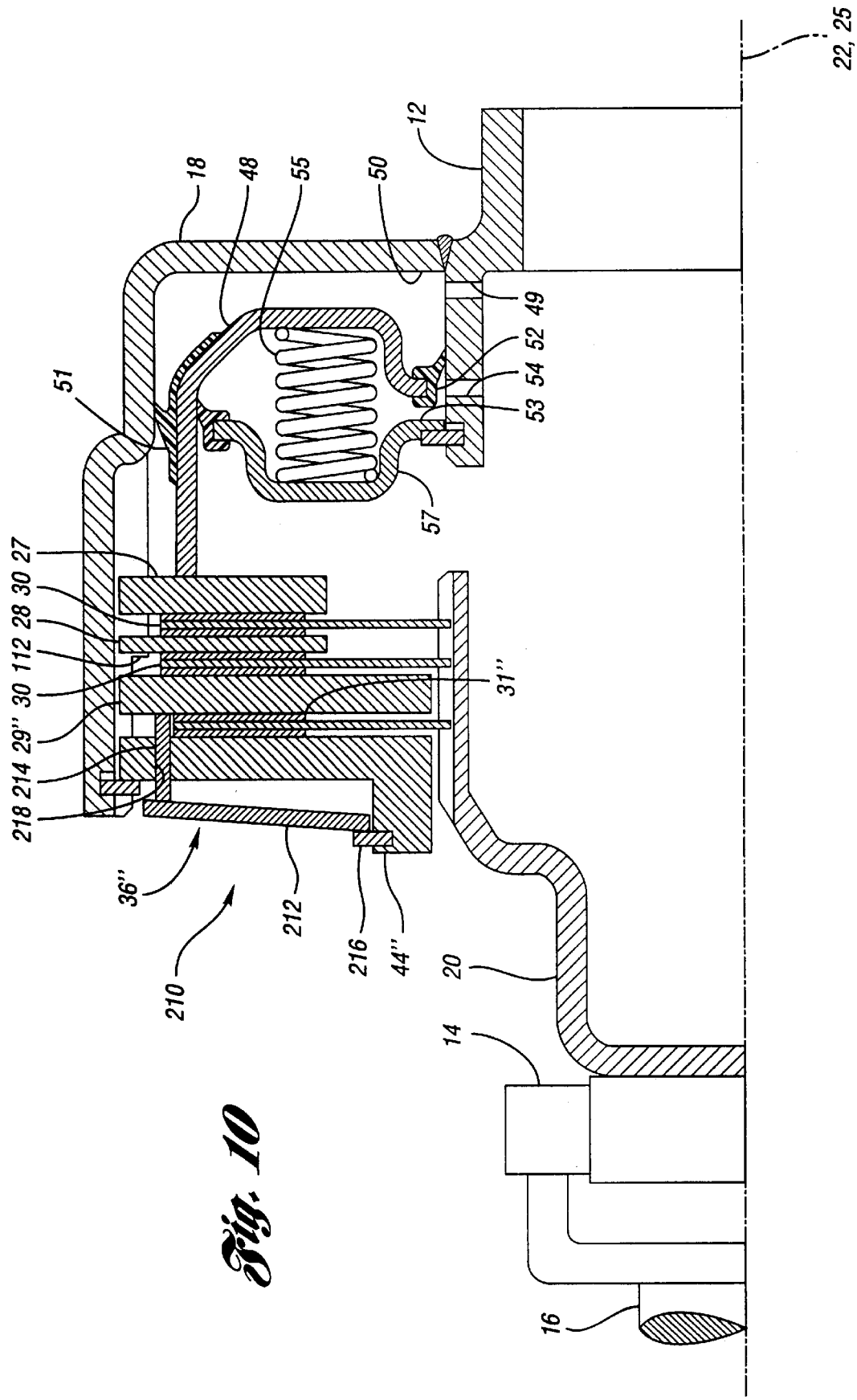
FIG. 10 is a cross-sectional view of the clutch assembly of FIG. 8 in high gain mode, in which a second quantity of clutch plates are engaged with each other.

FIGS. 8 through 10 show an upper portion of a third embodiment 210 of the clutch assembly, which operates in a similar manner as the clutch assembly 110. Similar components of the clutch assembly 210 and clutch assembly 110 are identified with the same reference numbers.

As shown in FIGS. 8 through 10, clutch assembly 210 is provided with a movement-inhibiting member 36" that includes a spring element 212, such as a Belleville spring or washer, and one or more engaging elements, such as pins or struts 214, which extend between the spring element 212 and reaction plate 29". In the embodiment shown in FIGS. 8 through 10, the spring element 212 is retained by end plate 44". For example, the clutch assembly 210 may include a retaining device 216, such as a snap ring or retaining ring, engaged with the end plate 44" and the spring element 212 for retaining the spring element 212. As another example, the spring element 212 may be connected to the end plate 44" with fasteners or by other suitable means. Alternatively, the spring element 212 may be connected to the housing 18 or hub 20.

While the movement-inhibiting member 36" may include any suitable number of struts 214, in one embodiment of the invention, the movement-inhibiting member 36" includes at least two struts 214, and preferably at least three struts 214, that are spaced at generally equal angular distances apart so as to inhibit tipping or tilting of the reaction plate 29". In the embodiment shown in FIG. 8, each strut 214 also extends through a hole 218 formed in the end plate 44". Furthermore, the struts 214 may be connected to the spring element 212 or the reaction plate 29". Alternatively, the struts 214 may not be fixedly connected to either the spring element 212 or the reaction plate 29", and may instead engage the spring element 212 and the reaction plate 29".

In a manner similar to that described above with respect to the clutch assembly. 110, the movement-inhibiting member 36" urges reaction plate 29" toward a first position, shown in FIGS. 8 and 9, in which the reaction plate 29" is engaged with shoulder 112 of housing 18. Furthermore, the movement-inhibiting member 36" operates to maintain the reaction plate 29" generally at the first position when the clutch assembly 210 is operated in a first or low gain mode, shown in FIG. 9. When the clutch assembly 210 is operated in a second or high gain mode, the movement-inhibiting member 36" allows the reaction plate 29" to move to a second position, shown in FIG. 10. When the reaction plate 29" is in the second position, the reaction plate 29" is engaged with friction plate 31, and friction plate 31" is engaged with end plate 44".

Advantageously, the movement-inhibiting member 36" may be configured such that the spring force exerted by the spring element 212 diminishes as the spring element 212 is flattened out, or otherwise compressed, due to movement of the reaction plate 29" toward the second position. As a result, torque capacity may be maximized when the clutch assembly 210 is operating in high gain mode.

Although the plates 29", 31" and 44" are shown with generally vertical surfaces, the plates 29", 31" and 44" may have angled surfaces such as shown with the clutch assembly 10. Furthermore, a torque-transmitting assembly, according to the invention and having similar components as the clutch assembly 210, may be configured to operate as a brake assembly. With such a brake assembly, as mentioned above, either the housing 18 or the hub 20 does not rotate with respect to housing axis 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multi-mode torque-transmitting assembly comprising:
    a plate-supporting element having an axis;
    a plate connected to the plate-supporting element such that the plate is axially movable with respect to the plate-supporting element between a first position and a second position in response to applied axial forces; and
    a movement-inhibiting member in sufficient cooperation with the plate for selectively inhibiting axial movement of the plate, wherein the movement-inhibiting member inhibits movement of the plate from the first position in response to a first axial force, and allows movement of the plate to move toward the second position in response to a second axial force greater than the first axial force, such that the assembly is operable in more than one mode;
    wherein the movement-inhibiting member extends between the plate-supporting element and the plate.

2. The assembly of claim 1 wherein the plate-supporting element includes a recess, and the movement-inhibiting member is movably associated with the plate such that the movement-inhibiting member is movable between an engaged position, in which the movement-inhibiting member is engaged with the recess to maintain the plate generally at the first position, and a disengaged position, in which the movement-inhibiting member is sufficiently disengaged from the recess to allow the plate to move toward the second position.

3. The assembly of claim 2 wherein the plate includes a cavity, and the movement-inhibiting member is disposed at least partially in the cavity.

4. The assembly of claim 3 wherein the movement-inhibiting member includes a spring and a engaging element engaged with the spring.

5. The assembly of claim 1 wherein the plate-supporting element is a housing, and the plate is a reaction plate.

6. The assembly of claim 1 further comprising an actuator that cooperates with the plate to apply the first and second axial forces to the plate.

7. The assembly of claim 1 further comprising a spring that is engaged with the plate for urging the plate toward the first position.

8. The assembly of claim 1 further comprising an end plate that is connected to the plate-supporting element such that the end plate is not axially movable with respect to the plate-supporting element, and the movement-inhibiting member extends between the end plate and the plate.

9. The assembly of claim 8 wherein the plate-supporting element has a shoulder that is engageable with the plate when the plate is in the first position.

10. The assembly of claim 8 wherein the movement-inhibiting member comprises a spring element disposed between the end plate and the plate.

11. The assembly of claim 8 wherein the movement-inhibiting member includes a spring element retained by the end plate, and an engaging element disposed between the spring element and the plate.

12. The assembly of claim 11 further comprising a retaining device engaged with the end plate and the spring element for retaining the spring element.

13. The assembly of claim 11 wherein the end plate has a hole extending therethrough and is disposed between the spring element and the plate, and wherein the engaging element extends through the hole.

14. The assembly of claim 1 further comprising an additional plate that is engageable with the plate when the plate moves toward the second position.

15. The assembly of claim 14 wherein the plate has an angled surface that is engageable with the additional plate when the plate moves toward the second position.

16. The assembly of claim 15 wherein the additional plate extends at an angle with respect to the axis of the plate-supporting element.

17. The assembly of claim 14 further comprising an additional plate-supporting element that supports the additional plate such that the additional plate is axially movable with respect to the additional plate-supporting element.

18. The assembly of claim 17 wherein the additional plate-supporting element is stationary.

19. The assembly of claim 17 wherein the plate-supporting element is stationary.

20. The assembly of claim 17 wherein both the plate-supporting element and the additional plate-supporting element arc rotatable about the axis.

21. A multi-mode torque-transmitting assembly comprising:
    a plate-supporting element having an axis;
    a plate supported by the plate-supporting element such that the plate is axially movable with respect to the plate-supporting element between a first position and a second position in response to applied axial forces;
    first and second additional plates positioned proximate the plate such that the plate is disposed between the additional plates, the additional plates being engageable with the plate; and
    a movement-inhibiting member in sufficient cooperation with the plate for inhibiting axial movement of the plate, the movement-inhibiting member being configured to sufficiently inhibit axial movement of the plate when a first axial force is applied to the plate by the first additional plate so that the plate remains generally at the first position, the movement-inhibiting member further being configured to allow the plate to move toward the second position and engage the second additional plate when a second axial force greater than the first axial force is applied to the plate by the first additional plate.

22. A multi-mode torque-transmitting assembly comprising:

a plate-supporting element having an axis;

a plate pack including multiple plates, one of the plates being supported by the plate-supporting element such that the one plate is axially movable with respect to the plate-supporting element between a first position and a second position in response to applied axial forces;

a movement-inhibiting member in sufficient cooperation with the one plate for inhibiting axial movement of the one plate, the movement-inhibiting member being configured to maintain the one plate generally at the first position when a first axial force is applied to the plate pack such that a first quantity of the plates engage each other to transmit torque therebetween, the movement-inhibiting member further being configured to allow the one plate to move toward the second position when a second axial force greater than the first axial force is applied to the plate pack such that a second quantity of the plates engage each other to transmit torque therebetween, wherein the second quantity of the plates is greater than the first quantity of the plates; and a return spring engaged with said one plate for urging said one plate toward the first position.

23. A method of operating a multi-mode torque-transmitting assembly in multiple modes, the torque-transmitting assembly having a plate disposed between first and second additional plates, the plate being axially movable between first and second positions in response to applied axial forces, the method comprising:

applying a first axial force to the first additional plate such that the first additional plate engages the plate, while inhibiting axial movement of the plate so that the plate remains generally at the first position, thereby operating the assembly in a first mode; and applying a second axial force greater than the first axial force to the first additional plate such that the first additional plate causes the plate to move axially toward the second position in which the plate is engaged with the second additional plate, thereby operating the assembly in a second mode.

* * * * *